United States Patent [19]

Drobadenko et al.

[11] Patent Number: 4,952,099

[45] Date of Patent: Aug. 28, 1990

[54] DEVICE FOR HYDRAULIC CONVEYANCE OF LOOSE MATERIALS

[75] Inventors: Valery P. Drobadenko; Olga A. Lukonina, both of Moscow; Vladimir P. Koval, Dnepropetrovsk; Vladimir I. Sokolov; Boris A. Maltsev, both of Volnogorsk, all of U.S.S.R.

[73] Assignee: Moskovsky Geologorazvedochny Institut Imeni Sergo Ordjonikidze, Moscow, U.S.S.R.

[21] Appl. No.: 399,214

[22] Filed: Aug. 28, 1989

[51] Int. Cl.⁵ .............................................. B65G 53/14
[52] U.S. Cl. ...................................... 406/50; 406/122; 406/168
[58] Field of Search ..................... 406/46, 47, 48, 49, 406/50, 108, 109, 154, 155, 168, 191, 170, 122

[56] References Cited

U.S. PATENT DOCUMENTS

| 4,039,105 | 8/1977 | Chan | 406/49 |
| 4,559,719 | 12/1985 | Dodson | 406/108 |
| 4,699,548 | 10/1987 | Bergstrom | 406/50 |

FOREIGN PATENT DOCUMENTS

| 252208 | 9/1969 | U.S.S.R. | |
| 912612 | 3/1982 | U.S.S.R. | |
| 1276596 | 12/1986 | U.S.S.R. | 406/108 |

*Primary Examiner*—Sherman D. Basinger
*Assistant Examiner*—Stephen P. Aviva
*Attorney, Agent, or Firm*—Lilling & Lilling

[57] ABSTRACT

A device for hydraulic conveyance of loose materials comprises a vertical chamber having a cylindrical side surface and hemispherical a bottom and a cover and is provided with four respective pipes for liquid discharge, loose material charging, feeding the pressure liquid flow and slurry discharge in an upward flow. The pipes are held to the hemispherical cover and are arranged coaxially in such a manner that the loose material charging pipe is accommodated inside the liquid discharge pipe, the pressure liquid flow feeding pipe is accommodated inside the loose material charging pipe, and the slurry upward flow discharging pipe is accommodated inside the pressure liquid flow feeding pipe, all of the pipes being arranged coaxially with the longitudinal axis of the chamber and having some of their portions located inside the chamber. The length of the portions mentioned above increases consecutively from the liquid discharge pipe towards the slurry upward flow discharging pipe.

4 Claims, 2 Drawing Sheets

DEVICE FOR HYDRAULIC CONVEYANCE OF LOOSE MATERIALS

INDUSTRIAL FIELD TO BE APPLIED

The invention relates generally to conveyance of materials by virtue of hydraulic means and more specifically to a device for hydraulic conveyance of loose materials.

The invention is successfully applicable in the mining industry, in civil engineering, metallurgy, and in the farming industry for hydraulic conveying of loose materials over long distances.

Of special interest is practical application of the industry for hydraulic conveyance of such loose materials as mineral raw materials, in dressing practice when mining placer and ore deposits by the opencast and underground mining techniques, as well as in construction of hydraulic engineering structures.

BACKGROUND OF THE INVENTION

Use of devices for hydraulic conveyance of loose materials is aimed at the solution of a basic problem, viz., to prevent the particles being conveyed from contact with the moving and flow-through components of pressure units, which leads to abrasive wear of said components, as well as to substitute low-pressure suction dredges or dredger pumps by much more powerful water pumps.

Hydraulic conveyance of loose materials over long distances requires, as a rule, intermediate pumpingover stations. However, such stations can be successfully substituted by a group of hydraulic conveying devices operating alternatively and accompanied, whenever necessary, by a parallel operation of several water pumps serving one such device.

Thus, the distance over which loose materials can be conveyed with the use of one such device depends, first and foremost, on the strength characteristics of said device.

Moreover, such device should meet a number of requirements determined by the specificity of their operation and influencing reliability and economy of the latter. One of the most important requirements resides in a reliable operation of such devices ruling out clogging or hanging of the solid material being handled in the chamber of the device, which depends on the method and direction of discharge accounted for by the arrangement of the discharge pipes of the device.

Thus, dredger pumps are able to transfer the whole amount of the loose material being handled having a definite comparably uniform density of the slurry, whereas various constructions of the aforesaid devices are as a rule featured by the presence of the so-called "dead" zones, i.e., a certain amount of the loose material that remains in the chamber after discharging, or the presence of a constant amount of process water in the chamber when the latter is filled with the loose material but incompletely. In this case when loose material different in quality and composition is fed into the chamber during the process cycle, discharge of the material will also be carried out differentially without averaging the material being handled, which affects adversely stability of operation of the device.

One state-of-the-art plant for hydraulic conveynace of slimes is known (SU, A, 252,208) to comprise a group of spherical chambers, each being provided with a pressure liquid flow feeding pipe, a liquid discharge pipe, a loose material charging pipe, and a slurry discharge pipe, each of said pipes communicating with the respective pipeline. The pressure liquid flow feeding pipe and the liquid discharge pipe are located in the top portion of the chamber, while two other pipes, in the bottom portion of the chamber, a flexible diaphragm being interposed therebetween, which is adapted to discharge excess liquid when the chamber is being filled and to expel the slurry under pressure into the respective pipeline.

A spherical shape of the chambers of the aforedescribed plant makes provision for uniform distribution of stresses in the walls during operation under pressure. However, provision of four holes for holding the aforesaid pipes thereto and two another holes for the flanged-mounted flexible diaphragm affects much the safety margin of the chambers. Provision of a flexible diaphragm in the chamber places limitation upon the pressure of the discharge liquid flow due to low strength characteristics of said diaphragm, which in turn reduces the slurry conveyance range. Technological capabilities for making high-capacity spherical chambers are limited very much, which results in a great number of switching-over operations and hence in a bad concentration of local stresses at places where the pipes, as well as the diaphragm are held.

Location of the loose material feeding pipe and the slurry discharging pipe in the bottom portion of the chamber predetermines charging a loose material in the zone of countercurrent, which involves additional head losses and hence additional power consumption, and its discharge from the chamber in a downward current, which promotes clogging of said pipes.

The operating efficiency of the plant as a whole is affected due to the presence of the "dead" zones in the upper portions of the chambers, which are filled with liquid after the loose material has been charged therein.

One more prior-art device for hydraulic conveyance of loose materials (SU, A, 912,612) is known to comprise a vertical chamber having a cylindrical side surface, a cover and a bottom and provided with a pipe for feeding a pressure liquid flow, which is then discharged from the chamber when the loose material being handled is charged into said chamber, a loose material charging pipe and a pipe for discharging the slurry in an upward flow, which is arranged coaxially with said loose material charging pipe and is accommodated therein, both of said pipes being arranged coaxially with the longitudinal chamber axis and being fixed to the chamber cover, while some portions thereof are located inside said chamber.

In the aforedescribed device the pressure liquid flow feeding pipe and the liquid discharging pipe are integrated into a single pipe operating alternatively. Besides, the chamber is provided with a by-pass pipe aimed at prevention of a "dead" zone from the loose material in the chamber bottom portion, as well as with an elastic bulb secured in the chamber cover and adapted to transfer the delivery pressure in the course of discharging the slurry from the chamber.

The aforementioned shape of the chamber is featured by but a low margin of safety. Provision of two holes for attaching the pipes and another two holes for fastening the bypass pipe also affects adversely the strength characteristics of the chamber and hence reduce the range of the slurry conveyance. Provision of an elastic bulb also place limitation on the delivery pressure developed and hence the range of the slurry conveyance. Besides, said bulb is liable to be sucked into the slurry upward flow discharging pipe. Apart from that, provision of such a bulb predetermines the presence of a "dead" zone of another kind in the chamber, that is, a constant volume of process water, which curtails the chamber discharge time and hence results in a great number of switching-over operations, which in turn affects adversely the chamber strength characteristics. Provision of said bulb is also causative of a low density of the slurry being conveyed, which is accounted for by the construction of the dredger pump, and a drastic change of the density in the course of the operating cycle.

The device under consideration is also featured by a sophisticated production process, assembly and mounting, which renders its application less efficient, as well as by possible nonuniformity of charging the loose material being handled, which tells adversely on the quality of the slurry.

SUMMARY OF THE INVENTION

It is an object of the invention to provide a device for hydraulic conveyance of loose materials, which would be capable of higher reliability of the hydraulic conveyance process and longer distance of such conveyance.

It is another object of the invention to provide a device for hydraulic conveyance of loose materials, which would ensure discharge of a loose material without clogging and in a full volume of the chamber.

It is one more object of the invention to provide a device for hydraulic conveyance of loose materials, which would ensure stable-quality high-density slurry.

The foregoing objects are accomplished due to the fact that a device for hydraulic conveyance of loose materials, comprising a vertical chamber having a cylindrical side surface, a bottom and a cover and provided with a pipe for feeding a pressure liquid flow with its subsequent discharge from said chamber when charging the loose material being handled, a loose material charging pipe and a pipe for slurry discharge in an upward flow, the latter pipe being accommodated in the former pipe coaxially therewith, while both of said pipes are arranged coaxially with the chamber longitudinal axis and are secured to the chamber cover, and some portions of said pipes are accommodated inside said chamber, according to the invention, the cover and bottom of the chamber are hemispherical in shape, the pressure liquid flow feeding pipe is held to the hemispherical cover of the chamber and is arranged coaxially with the loose material charging pipe and the slurry upward flow discharging pipe and is interposed therebetween, while provision is made for a liquid discharge pipe adapted to withdraw the liquid from the chamber when charging the loose material being handled, said liquid discharge pipe being held to the hemispherical cover and arranged coaxially with the loose material charging pipe outside the latter, while the liquid discharge pipe and the pressure liquid flow feeding pipe have some of their portions accommodated inside the chamber, and the length of the portions of the aforementioned pipes for liquid discharge, loose material charging, pressure liquid flow feeding and slurry discharge in an upward flow accommodated inside the chamber, gradually increases from the liquid discharge pipe towards the slurry upward flow discharge pipe.

It is expedient that in a device for hydraulic conveyance, according to the invention, the inlet opening of the slurry upward flow discharge pipe be spaced a distance apart from the lower point of the hemispherical bottom, which is equal to at least 0.25 d, where d is the diameter of the slurry upward flow discharging pipe, while the outlet opening of the pressure liquid flow feeding pipe be located above the inlet opening of the slurry upward flow discharging pipe at a distance from the lower point of the hemispherical bottom, not exceeding the length of the radius of its curvature.

It is favorable that in a device for hydraulic conveyance, according to the invention, the loose material charging pipe be provided with a sealing element installed at the end thereof situated outside the chamber, while the inlet opening of the loose material charging pipe be located on the side surface thereof and its axis be offset with respect to the longitudinal axis of the loose material charging pipe so as to provide tangential feed of the loose material being handled.

The proposed device for hydraulic conveyance of loose materials is featured by high margin of safety, which is due to the fact that effective stresses are uniformly distributed over the entire volume of the vertical chamber having a cylindrical side surface and hemispherical bottom and cover. The holes for holding the pipes that create local stress concentrations and are subject to fatigue failure under alternating loads applied thereto (viz., charging and discharge pressure), are made as a single hole, while the pipes are arranged symmetrically and their length increases from the outer pipe towards the inner one, which also adds to the safety of margin and extends considerably the service life of the device due to a reduced number of possible zones of failure and hence lesser adverse influence of such zones. Thus, higher strength characteristics of the device contribute to a longer distance of hydraulic conveyance.

Moreover, the device of the invention is capable of discharging the loose material being handled without clogging and from the entire volume of the chamber with high density of the slurry, which is attained due to its discharge in an upward flow and arrangement of the inlet opening of the slurry discharging pipe at a distance from the lower point of the hemispherical bottom, which is equal to at least 0.25 d, and arrangement of the outlet opening of the pressure liquid flow feeding in a position offset with respect to the inlet opening of the discharge pipe and at a distance from the lower point of the hemispherical bottom not exceeding the length of the radius of its curvature. The amount of clearance between the lower point of the hemispherical bottom and the inlet opening of the discharge pipe is selected proceeding from a prerequisite of equal rates of flow through said clearance and said pipe. Upward displacement of the outlet opening of the feed pipe makes it possible to forward the major part of the liquid into the chamber for pulp formation therein, thus ruling out any withdrawal of the liquid through the slurry discharge pipe, while the fact that said outlet opening is spaced apart from the lower point of the hemispherical bottom a distance not exceeding the length of the radius of its curvature precludes formation of plugs of the loose material in the zone of the inlet opening of the discharge pipe, such plugs being liable to occur due to the fact that the liquid runs short of the inlet opening of the discharge pipe and is spread over the entire volume of the chamber.

The aforementioned disposition of the inlet and outlet openings of the pipes also prevents formation of the "dead" zones in the form of a constant amount of non-dischargeable loose material at the chamber bottom.

Thus, reasonable utilization of the whole volume of the chamber counteracts the effect of such transient conditions as discharge, switching-over, charging on stress concentration nearby the hole and in the areas where the pipes are made fast, thereby adding to the margin of safety of the device as a whole.

The device of the invention also makes it possible to obtain stable-quality slurry, which is attained due a tangential feed of the loose material through an annular gap between the loose material charging pipe and the pressure liquid flow feeding pipe. Such a tangential feed prevents formation of the layers different in quality and enables the loose material to be spread uniformly over the entire cross-sectional area, which provides for, with the hemispherical shape of the bottom, the feed of the loose material to the inlet opening of the discharge pipe maximally uniform as for quality. In addition, the tangential feed of the loose material in the form of slurry minimizes the loss of the loose material through the liquid discharge pipe, since in this case the loose material gets separated from the carrying liquid at a higher rate under the effect of centrifugal forces, as well as intensified settling down of the minutest particles of the loose material. Besides, the angle of opening of a swirled current of the liquid at the outlet of the charging pipe, as well as an extended path of flow of the slurry being fed inside the charging pipe contribute to an abrupt reduction of the flow velocity of the slurry being charged and hence to a lesser degree of carry-away of the loose material at the discharge end.

BRIEF DESCRIPTION OF THE DRAWINGS

In what follows the invention is illustrated by a detailed description of a specific exemplary embodiment thereof and the accompanying drawings, wherein.

Figures 1, 2:
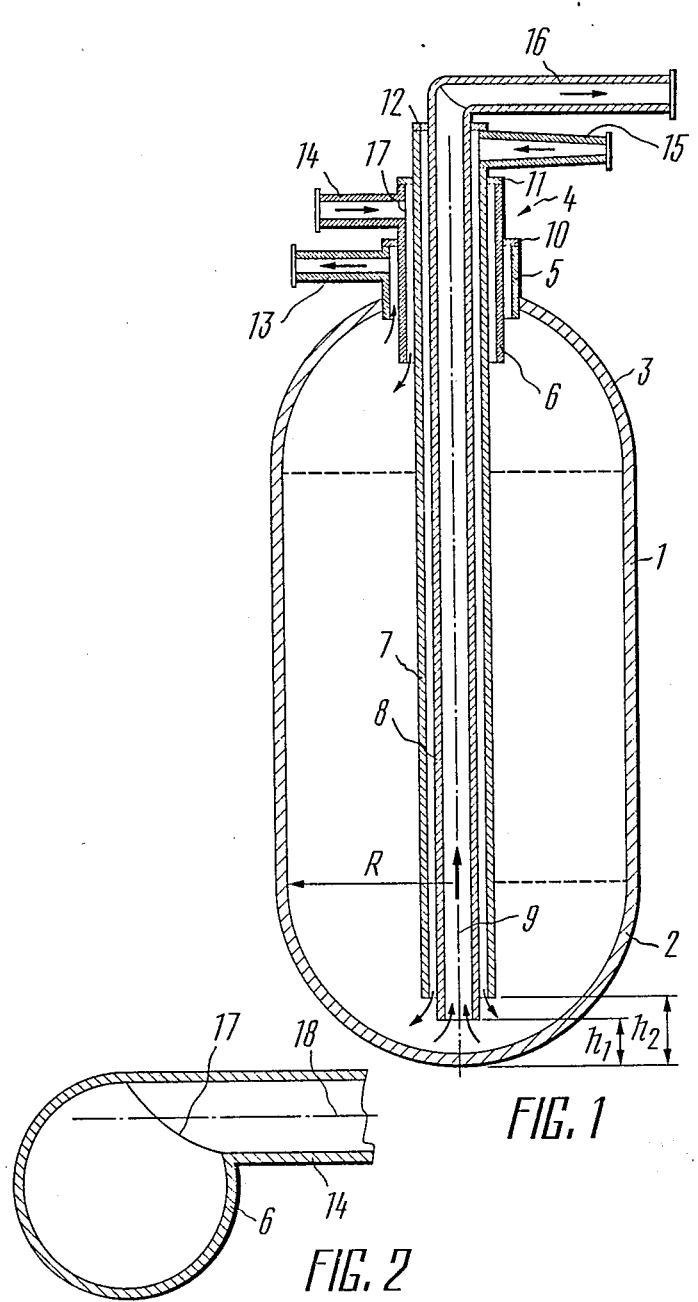
FIG. 1 is a general longitudinal sectional view of a device for hydraulic conveyance of loose materials, according to the invention.
FIG. 2 is a cross-sectional view of a loose material charging pipe showing an inlet opening located on its side surface for tangential feed of the slurry from the feed piping, and a longitudinal sectional view of a segment of said piping, according to the invention.

The device for hydraulic conveyance of loose materials comprises a vertical chamber 1 (FIG. 1) having a cylindrical side surface and hemispherical a bottom 2 and a cover 3. The chamber 1 is provided with a charging-discharge unit 4 installed in the hemispherical cover 3 and comprising four pipes 5, 6, 7, 8 arranged coaxially with one another and with a longitudinal axis 9 of the chamber 1. The pipe 5 is for discharge of the process liquid, viz., replaced process water and is provided with a sealing element 10 located at the pipe end outside the chamber 1 and accommodating the pipe 6 for charging the loose material being handled. The pipe 6 is provided with a sealing element 11 situated at its end outside the chamber 1 and accommodating the pipe 7 for feeding the pressure liquid flow. The pipe 7 is provided with a sealing element 12 disposed at its end outside the chamber 1 and accommodating the pipe 8 for slurry discharge in an upward flow.

With such a construction arrangement of the charging-discharge unit 4 the pipes 5, 6, 7, 8 differ in the length of their segments located inside the chamber 1, so that each of the next pipes in a direction from the outer towards the inner one has a greater length in order to provide the process of pulp preparation and hydraulic conveyance.

The pipes 5, 6, 7, 8 communicate respectively with a discharge piping 13, a pulp feed piping 14, a pressure water conduit 15 and a main transmission pipeline 16.

To provide a reliable and efficient operation of the device for hydraulic conveyance of loose materials, the pipes 7 and 8 are arranged practically throughout the length of the chamber 1, the inlet opening of the pipe 8 for discharge of the slurry in an upward flow is spaced a distance $h_1$ apart from the lower point of the hemispherical bottom 2, which is equal to at least 0.25 d, where d is the diameter of the pipe 8, while the outlet opening of the pressure liquid flow feeding pipe 7 is situated above the inlet opening of the pipe 8 and is spaced a distance $h_2$ apart from the lower point of the hemispherical bottom 2, not exceeding the length of a radius R of its curvature.

To ensure a uniform charging of the loose material and to minimize the amount of the loose material particles carried away through the liquid discharge pipe 5, an inlet opening 17 of the loose material charging pipe 6 is located on its side surface and its axis 18 (FIG. 2) is offset relative to the longitudinal axis of the pipe 6 which aligns with the longitudinal axis 9 of the chamber 1 (FIG. 1).

Figure 3:
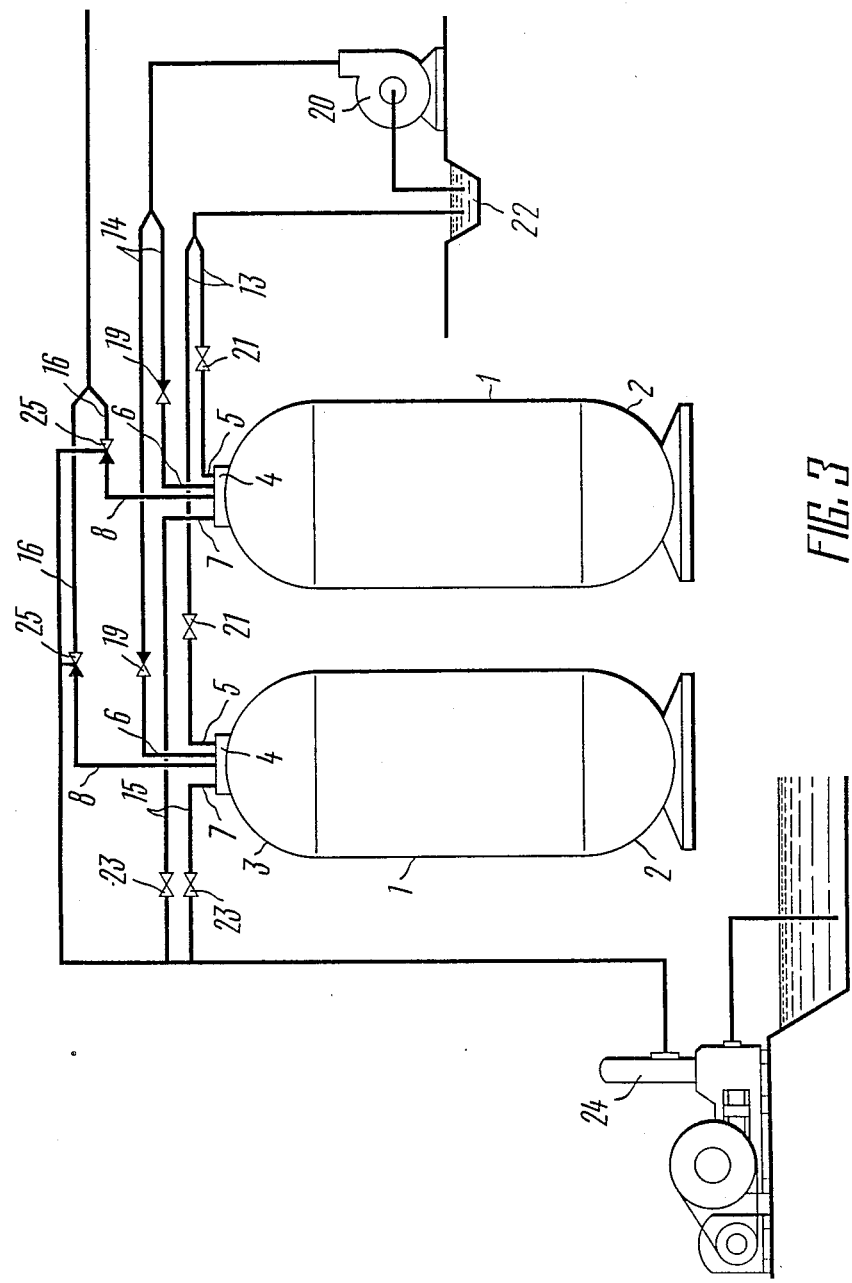
FIG. 3 is a general diagrammatic view of a set for hydraulic conveyance of loose materials, comprising two devices for hydraulic conveyance of loose materials, according to the invention.

The device for hydraulic conveyance of loose materials is in fact an integral part of a plant for hydraulic conveyance of loose materials. To provide a continuous operation of the device the plant should comprise two or more such devices, each communicating with a low-lift suction dredge 20 through the pulp feeding pipe 14 provided with a check valve 19 (FIG. 3), with a sump 22 of the low-lift suction dredge 20 through the discharge piping 13 provided with a gate valve 21 to eliminate possible loss of the loose material being handled, with a high-lift water pump 24 through the pressure water conduit 15 provided with a gate valve 23, as well as with the main transmission pipeline 16 provided with a check valve 25.

OPERATION

The device for hydraulic conveyance of loose materials operates as follows. The loose material being handled is charged in the form of slurry by the low-lift suction dredge 20 (FIG. 3) through the respective loose material charging pipe 6 into the chamber 1 (FIG. 1) filled with water. It is under the effect of gravitational force and centrifugal acceleration developed during swirling of the flow liquid that the solids settle down to the bottom of the chamber 1, thus displacing the excess liquid along the liquid discharge pipe 5 and the discharge piping 13. The charging process lasts until the loose material fills the chamber 1 to the level of the outlet opening of the charging pipe 6. The charging over, the pipes 6 and 5 are shut off by the check valve 19 (FIG. 3) and the gate valve 21, respectively. Then a pressure flow of liquid is fed by the high-lift water pump 24 through the respective pressure liquid flow feeding pipe 7 (FIG. 1) to the lower portion of the chamber 1 charged with the loose material being handled. It is by virtue of a hydrodynamic effect of the liquid on the loose material that its particles are torn away from the bulk of the material and are expelled, under high pressure, into the slurry upward flow discharging pipe 8 and further on said particles are conveyed as slurry along the main transmission pipeline 16 over a required distance. To effect uninterrupted hydraulic conveyance of loose materials the charging and discharge processes occur alternatively in the devices of the plant.

With the abovesaid arrangement of the pressure liquid flow feeding pipe 7 and the slurry upward flow discharging pipe the pulp formation process occurs in the near-the-bottom portion of the chamber 1 and the resultant slurry is withdrawn from the lower point of the hemispherical bottom 2, thus preventing formation of "dead" zones. As the discharging process proceeds the loose material in the chamber 1 sinks under its own weight without bridging and is brought to the inlet opening of the pipe 8 uniformly from every side. The pressure liquid flow is subdivided into three parts in the zone of the outlet opening of the pipe 7 due to the aforesaid arrangement of the pipes 7 and 8, the major part of the liquid being spent for pulp formation, while the smaller part of the liquid ascends along the pressure liquid flow feeding pipe 7 into the upper portion of the chamber 1 to substitute for the loose material being discharged, and the third smallest part of the liquid descends along the pipe 8, passes over the inlet opening of the pipe 8 and is discharged along with the thus-formed slurry into the main transmission pipeline 16, thus protecting the end portion of the slurry upward flow feeding pipe 8 against abrasive wear.

EFFECT OF THE INVENTION

The proposed device for hydraulic conveyance of loose materials is featured by high operating reliability and provides for a considerable range (e.g., up to 10 km) of conveyance of slurry having a density of 1.25 to 1.45 t/m$^3$ with a zero difference of height for sand-and-gravel materials. Charging of the chamber with the loose material and discharge of the latter from the chamber are carried out practically within the entire volume of the chamber, thus making it possible to attain high efficiency of the device with a small number of switching-over operations.

In addition, the device enables a loose material to be conveyed in the form of uniform-quality slurry.

What is claimed is:

1. A device for hydraulic conveyance of loose materials, comprising:
    a vertical chamber having a cylindrical side surface and hemispherical a bottom and a cover;
    a first, second, third and fourth pipe of said chamber, the first of which is for the liquid discharge, the second, for loose material charging, the third, for feeding the pressure liquid flow, and the fourth, for slurry discharge in an upward flow, said pipes being held in said hemispherical cover and arranged coaxially—the second pipe inside the first pipe, the third pipe inside the second pipe, and the fourth pipe inside the third pipe, all the pipes being arranged coaxially with the longitudinal axis of said chamber;
    portions of the first, second, third and fourth pipes respectively for the liquid discharge, loose material charging, pressure liquid flow feeding and slurry discharge in an upward flow, accommodated in said chamber and having a length consecutively increasing from the first pipe for liquid discharge towards the fourth pipe for slurry discharge in an upward flow.

2. A device for hydraulic conveyance as claimed in claim 1, comprising:
    the inlet opening of the fourth pipe for slurry discharge in an upward flow, said opening being spaced apart from the lower point of said hemispheric bottom a distance equal to at least 0.25 d, where d is the diameter of the fourth pipe;
    the outlet opening of the third pipe for feeding the pressure liquid flow, said opening being located above said inlet opening of the fourth pipe for slurry discharge in an upward flow and being spaced apart from the lower point of said hemispherical bottom a distance not exceeding the length of the radius of its curvature.

3. A device for hydraulic conveyance as claimed in claim 1, comprising:
    the second pipe for loose material charging, having a side surface, an inlet opening located on said side surface so that its axis is offset relative to the longitudinal axis of the second pipe in order to provide tangential feed of the loose material, and an end situated outside said chamber;
    a sealing element of the second pipe for loose material charging, installed on said end thereof.

4. A device for hydraulic conveyance as claimed in claim 2, comprising:
    the second pipe for loose material charging, having a side surface, an inlet opening located on said side surface so that its axis is offset relative to the longitudinal axis of the second pipe in order to provide tangential feed of the loose material, and an end situated outside said chamber;
    a sealing element of the second pipe for loose material charging, installed on said end thereof.

* * * * *